United States Patent [19]

Sherman

[11] 4,026,113
[45] May 31, 1977

[54] TILTING CAB CONTROL APPARATUS

[76] Inventor: Clarence A. Sherman, 31303 Churchill, Birmingham, Mich. 48009

[22] Filed: June 1, 1976

[21] Appl. No.: 691,277

[52] U.S. Cl. .............................. 60/477; 60/DIG. 10; 180/89.18; 296/28 C
[51] Int. Cl.² ....................................... F16D 31/02
[58] Field of Search ..... 60/473, 477, 479, DIG. 10; 180/89 A; 296/28 C

[56] References Cited

UNITED STATES PATENTS

| 3,761,123 | 9/1973 | Neill et al. | 296/28 C |
|---|---|---|---|
| 3,792,747 | 2/1974 | Knutson | 180/89 A |
| 3,800,537 | 4/1974 | Denis | 60/477 |
| 3,801,151 | 4/1974 | Reynolds et al. | 296/28 C |
| 3,910,313 | 10/1975 | Nordell | 137/625.23 |

Primary Examiner—Edgar W. Geoghegan
Attorney, Agent, or Firm—Reising, Ethington, Barnard, Perry and Brooks

[57] ABSTRACT

Tilting cab control apparatus including a horizontally extending hydraulic pump reservoir cover plate having upper and lower surfaces and edge surfaces extending between the upper and lower surfaces to define the periphery of the plate. A pump reservoir having an upper opening is sealed against the lower surface of the cover plate such that the upper and edge surfaces thereof are exposed. A pump opening of the cover plate, a pump in the opening, a valve bore communicated with the pump opening, and a control valve in the valve bore cooperate to provide pumped hydraulic fluid to a tilting cab control cylinder. One embodiment of the cover plate is specifically designed for use with single acting cylinders while a second embodiment is designed for use with double acting cylinders.

18 Claims, 10 Drawing Figures

TILTING CAB CONTROL APPARATUS

BACKGROUND OF THE INVENTION

1. Field of the Invention

The present invention relates to tilting cab control apparatus of the type typically used on tilting truck cabs, and more particularly to hydraulic pump reservoir cover structure of such apparatus.

2. Description of the Prior Art

Vehicle tilting cab control apparatus conventionally includes a hydraulic pump that feeds hydraulic fluid to an extendable cylinder whose extension raises a cab in a tilting fashion from a lower use position to an access position where access to the associated vehicle engine is permitted. With one type of such a cab vehicle, the extendable cylinder is "single acting" and is supplied pumped hydraulic fluid only to extend its length. Release of the hydraulic fluid with this type of cab permits the cylinder to retract under the force of gravity acting on the cab in a downward direction to move it to its lower use position. Another type of tilting cab vehicle incorporates a "double acting" cylinder that is supplied pumped hydraulic fluid to extend and retract the cylinder in a manner that drives the cab between its access and use positions. The cab of the latter type vehicle can have its center of gravity move across the axis of cab tilting since the cylinder can work against the downward bias of gravity acting on the cab. A single acting hydraulic cylinder for a titling cab vehicle is fed hydraulic fluid from a pump through a single conduit. A pair of conduits are utilized to feed hydraulic fluid from a pump to a double acting cylinder, with one of the conduits feeding fluid to the cylinder to cause its extension, and with the other conduit feeding fluid to the cylinder to cause its retraction. Both types of the hydraulic cylinder are fed fluid from pumps that pump hydraulic fluid out of a reservoir. Suitable valves must be incorporated with the pumps for either type of cylinder in order for the hydraulic control apparatus to function properly. Such valves have heretofore been bolted or otherwise secured to the exterior of their associated pump reservoirs.

The United States Patent of Nordell U.S. Pat. No. 3,910,313 discloses tilting cab control apparatus incorporating a fluid reservoir having pump and valve structure of the type to which the present invention relates. The fluid reservoir disclosed by this patent has an opening that opens to the side and is covered by a vertically extending pump housing whose outer side has a valve unit bolted in position in an outwardly projecting fashion.

SUMMARY OF THE INVENTION

An object of the present invention is to provide improved tilting cab control apparatus incorporating a horizontally extending pump reservoir cover plate that can be economically fabricated and assembled with an associated control valve and a hydraulic pump to cover a fluid reservoir and control fluid for raising and lowering an associated cab.

The horizontally extending cover plate of the apparatus includes upper and lower surfaces and edge surfaces extending between the upper and lower surfaces to define the periphery of the plate. Adjacent the edge surfaces, the lower surface includes a mounting portion sealed with a pump reservoir opening such that the upper and edge surfaces of the plate are exposed. A pump opening extends between the upper and lower surfaces to mount a pump in a downwardly depending fashion such that the pump can pump fluid from the reservoir upwardly to the pump opening. A relief valve opening in the plate communicates with the pump opening and opens downwardly through the lower surface of the plate to mount a relief valve that permits excessively pressurized fluid to flow from the pump opening back tto the reservoir. Between its upper and lower surfaces, the cover plate includes a control bore that extends inwardly from one of the edge surfaces in communication with the pump opening to receive pumped fluid. A control orifice communicates the control valve bore with the lower surface of the plate to allow controlled fluid flow from the control valve bore back to the reservoir as permitted by a control valve received within this bore. An output port of the plate communicates with the pump opening and opens outwardly through one of the exposed plate surfaces to conduct fluid from the pump opening externally of the plate for flow to an associated hydraulic cylinder.

One preferred embodiment of the cover plate is utilized with a single acting cylinder and has a single output port communicated directly with the pump opening by a main bore. An intermediate portion of the main bore is communicated with the control valve bore whose control valve controls fluid flow downwardly through the control orifice back into the reservoir. When the control valve is positioned to prevent fluid flow through the control port, pumping of hydraulic fluid from the reservoir feeds the fluid through the pump opening and the main bore to the output port which then feeds the single acting cylinder to cause its extension and concomitant raising of the associated tilting cab. When lowering of the cab is desired, the control valve is positioned to permit the fluid to flow from the main bore through the control bore downwardly through the control orifice back into the reservoir such that the gravity bias of the cab causes cylinder retraction and concomitant fluid flow back to the reservoir. The main bore and the control valve bore are oriented in a perpendicular relationship extending inwardly from adjacent side edges of the plate.

Another preferred embodiment of the cover plate is utilized with a double acting cylinder that is driven in both extending and retracting directions to raise and lower an associated tilting cab. Two output ports of the plate, one for feeding fluid to the cylinder to drive it in each direction, are communicated with the pump opening through the control valve bore. The control valve received within the bore is movable between first and second positions to selectively conduct fluid from the pump opening to one or the other of the output ports, while the output port which is not being fed fluid is communicated by the control valve to the control orifice such that fluid can flow from the cylinder back into the control valve bore and downwardly through the control orifice into the reservoir. A valve housing of the valve receives a valve element which is movable between the first and second positions to control the fluid flow. The valve housing includes first and second fluid passageways respectively communicating with the two output ports and the valve element includes first and second passages for alternately feeding fluid from the pump opening to the first and second passageways of the housing in the first and second positions. A third passageway in the valve housing communicates with the control orifice of the plate and a third passage of the valve element provides the communication of the output ports through the first and second passageways with the third passageway to alternately permit the fluid flow from one or the other output port to the control orifice back into the reservoir.

Both preferred embodiments of the cover plate incorporate a pump having a telescoping construction that permits it to be utilized with fluid reservoirs of different heights. The pump includes a housing having an upper portion mounted within the pump opening and a lower portion slidable vertically with respect to the upper housing portion. A bore of the upper housing portion preferably receives the lower housing portion to provide the slidable interconnection between the housing portions. A check valve of the lower housing portion permits fluid flow from the reservoir into the bore of the upper housing portion but prevents fluid flow therefrom back into the reservoir. As disclosed, the pump is of the double acting type in which pumping occurs on both up and down strokes. However, the pump construction could also be utilized with a single acting type pump wherein pumping occurs only on the down stroke or on the up stroke.

The objects, features and advantages of the present invention are readily apparent from the following detailed description of the preferred embodiment taken in connection with the accompanying drawings.

DETAILED DESCRIPTION OF THE PREFERRED EMBODIMENTS

Figure 1:
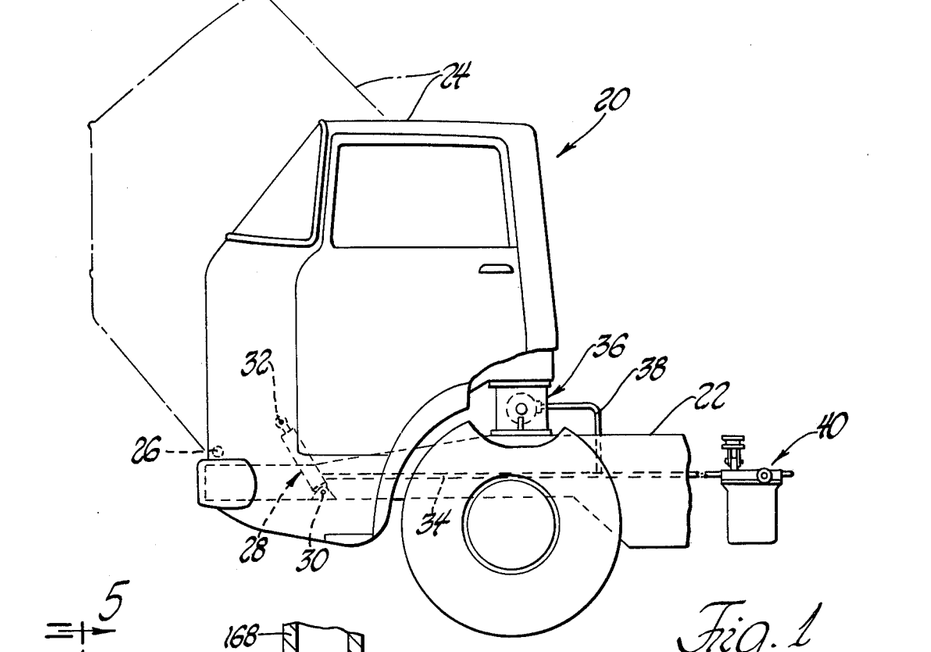
FIG. 1 is a side elevation view of a vehicle including tilting cab control apparatus constructed according to the present invention and designed to function with a single acting cylinder to raise and lower the passenger cab between the solid and phantom line positions shown.

With reference to FIG. 1 of the drawings, a vehicle 20 includes a frame 22 and a tilting passenger cab 24 that is movable on the frame about a transverse pintle 26 between the lower use position shown by solid lines and the upper access position shown by phantom lines. In the upper access position of the cab, the associated vehicle engine (not shown) is accessible for repair and maintenance. Movement of the cab 24 between its two positions is controlled by a single acting hydraulic cylinder 28 having one end 36 connected to the frame 22 and another end 32 connected to the cab. Hydraulic fluid is fed to the cylinder 28 by a conduit 34 to cause cylinder extension that raises the cab to its access position. Flow of the fluid from the cylinder, in a manner that will be more fully hereinafter described, permits cylinder retraction and concomitant cab movement to the lower use position shown by solid lines. A hydraulic latch mechanism 36 is utilized to secure the cab 24 in the lower use position. A conduit 38 that is tapped off of the conduit 34 feeds hydraulic fluid to the latch mechanism to release the cab for upward movement prior to cylinder extension tending to raise the cab. The latch mechanism includes a latch member spring biased to a latching position and movable against the spring bias by the pressure of fluid supplied through the conduit 38 in order to provide the unlatching prior to the cylinder extension. Apparatus embodying the present invention and providing control of the fluid flow to the conduit 34 is collectively indicated by reference numeral 40.

Figure 2:
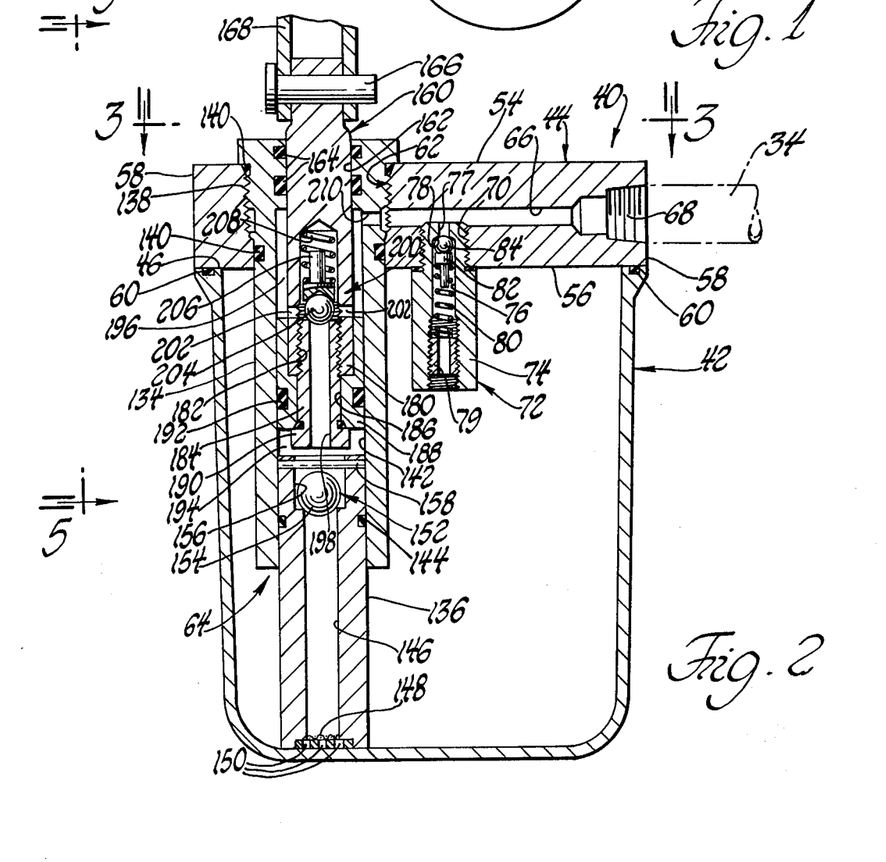
FIG. 2 is an elevation view in section of the apparatus shown in FIG. 1.

With reference to FIG. 2, control apparatus 40 includes a hydraulic fluid pump reservoir 42 and a cover plate 44 for the reservoir. Any suitable attachment method may be utilized to mount the reservoir 42 on the associated vehicle frame with its opening 46 oriented in an upwardly facing direction. Reservoir 42 has a generally rectangular configuration when viewed in the plan direction and has corner grooves 48, FIG. 5, that permit attachment bolts 50 to be inserted upwardly through holes in integral corner flanges 52 for threading into the cover plate 44 to secure it in position closing the upper reservoir opening. Cover plate 44 has parallel upper and lower surfaces 54 and 56 as well as edge surfaces 58 extending between the upper and lower surfaces to define the periphery of the plate. Adjacent its junction with the edge surfaces 58, the lower surface 56 includes a mounting portion that is sealed with the reservoir opening 46 in a fluid type relationship by a seal 60, FIG. 2. The upper surface 54 and the edge surfaces 58 of the plate are exposed to the environment in this mounted position of the cover plate.

As seen in FIG. 2, the cover plate 44 includes a threaded pump opening 62 that receives and mounts a hydraulic pump 64 in a downwardly depending fashion. Hydraulic fluid is pumped from the reservoir 42 by pump 64 upwardly in the pump opening 62 in a manner that is described later and is fed to the inner end of a main bore 66 whose outer end communicates with an output port 68 in one of the exposed edge surfaces to permit connection of the conduit 34 that feeds the cylinder 28 and latch mechanism 36 shown in FIG. 1. Adjacent the inner end of main bore 66, cover plate 44 includes a threaded relief opening 70 that is communicated with pump opening 62 through the main bore and opens downwardly through the lower surface 56 of the plate. A pressure relief valve 72 has an upper end that is threaded into relief opening 70 to be mounted in a downwardly depending fashion alongside pump 64. Relief valve 72 includes a housing 74 having a central bore 76 whose upper end includes a valve opening 77 surrounded by a valve seat 78. The lower end of bore 76 is threaded to receive a fitting 79 that seats the lower end of a helical spring 80 within bore 76. Spring 80 has an upper end that is sealed on the lower side of a T-shaped valve element 82 whose upper side carries a ball 84 that closes the valve opening 77. Valve 72 prevents the build up of excessive hydraulic fluid pressure by permitting fluid flow from the pump opening through main bore 66 back into reservoir 42. During normal operating conditions, the bias of spring 80 is sufficient to maintain ball 84 seated aganist valve seat 78 such that there is no flow of fluid from the main bore downwardly through the relief opening 70. However, if for some reason the pressure of hydraulic fluid being delivered from the pump opening 62 should build up above a predetermined value, the spring 80 will deflect to permit fluid flow downwardly through the valve opening 77 and thence through the valve bore 76 downwardly through the center of fitting 79 and into the reservoir. Rotation of fitting 79 causes axial movement thereof up or down due to its threaded support and thereby adjusts the bias of spring 80 and the predetermined fluid pressure necessary to cause fluid flow back to the reservoir.

Figure 3:
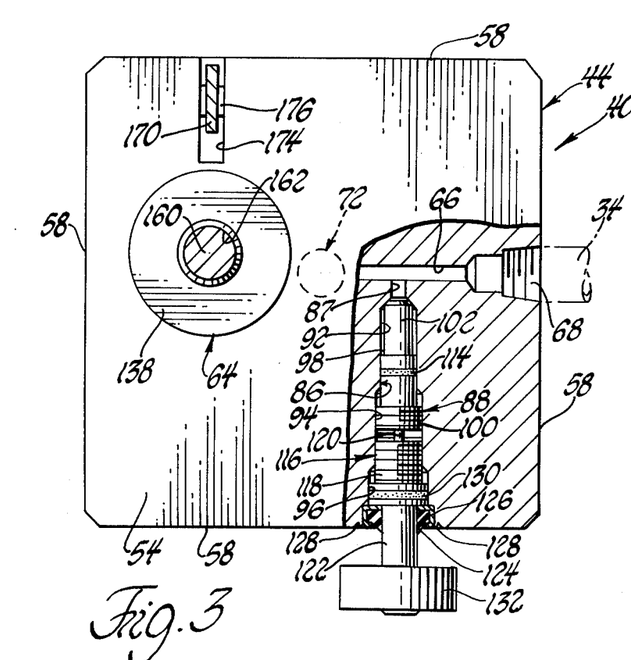
FIG. 3 is a top plan view of the apparatus taken approximately along line 3—3 of FIG. 2 but partially broken away to show a control valve.
Figure 4:
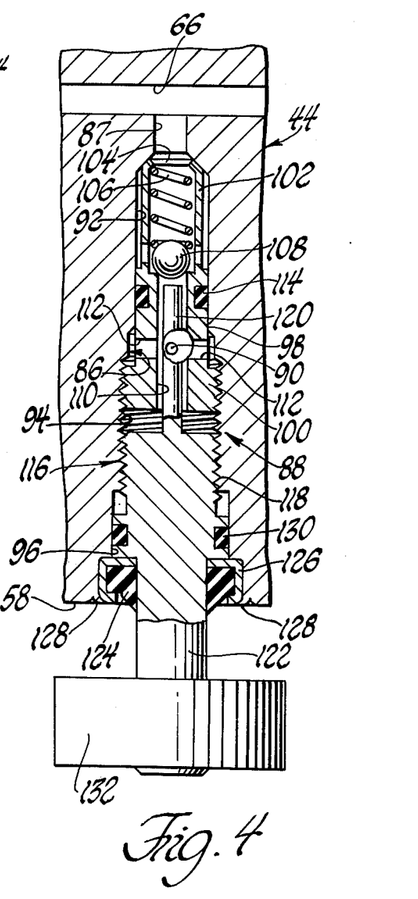
FIG. 4 is an enlarged view of a portion of FIG. 3 showing the control valve in section.

With reference to FIGS. 3 and 4, a control valve bore 86 in cover plate 44 extends inwardly from one of the edge surfaces 58 at a location between the upper and lower plate surfaces and has a reduced size inner end 87 communicated with an intermediate portion of main bore 66 at a location spaced outwardly from the relief valve 72. A control valve 88 is received within the control valve bore 86 and controls fluid flow into the bore and downwardly through a control orifice 90, FIG. 4, that communicates the lower side of the bore with the lower surface 56 of the cover plate. Control valve bore 86 includes a small diameter inner portion 92, a somewhat larger diameter intermediate portion 94 that is threaded, and a stepped large diameter outer portion 96. A valve housing 98 of valve 88 has a threaded outer end 100 received within the threaded intermediate bore portion 94 and a hollow inner end 102 with a round end aperture 104. The inner end of inner valve bore portion 92 communicates with the bore end 87 and hence with the main bore 66. A helical spring 106 received within the inner housing end 102 has one end seated adjacent the periphery of aperture 104 and has another end seated against a ball 108. A central bore 110 of housing 98 extends from its outer end 100 inwardly to provide a seat for the ball 108. Radial holes 112 communicate the bore 110 with the outer end of bore portion 92 where it is slightly enlarged to permit fluid flow around the valve housing and downwardly to the control orifice 90. An annular seal 114 of valve housing 98 prevents fluid from flowing between the valve housing and the control bore.

Control valve 88 also includes a valve element 116 seen in FIGS. 3 and 4. The valve element 116 controls fluid flow into the valve housing bore 110 and out through the holes 112 for passage downwardly through the control orifice 90. A threaded portion 118 of valve element 116 is threaded into the intermediate threaded bore portion 94 with an inner actuating portion 120 of the valve element projecting into the valve housing bore 110 toward the ball 108. An outer shaft portion 122 of valve element 116 extends outwardly through a seal 124 received within a stamped metal insert 126 that is maintained in position by deformations 128 in the cover plate. An annular seal 130 carried by the valve element is located inwardly from the seal 124 and seals with the outer bore portion 96. Valve element shaft portion 122 has a manually grasped handle 132 fixed to its outer end so as to permit rotation that moves the valve element axially within the bore 86. Rotation in one direction moves the valve element 116 towards the ball 108 so that the valve element actuator portion 120 unseats ball 108 from the inner end of valve housing bore 110. Hydraulic fluid can then flow from the main bore 66 around ball 108 into the bore 110 and then outwardly through the holes 112 for flow downwardly through orifice 90 into the reservoir. Rotation of the valve element 116 in the opposite direction moves the valve element 116 outwardly to permit spring 106 to seat ball 108 against the inner end of valve housing bore 110 to prevent the fluid flow back into the reservoir through control orifice 90.

The control valve 88 is positioned in a closed condition to prevent fluid flow from the pump back into the reservoir through control orifice 90, FIG. 4, when an operator desires to raise the cab from its lower use position shown in FIG. 1 to its upper access position. Pumped fluid then flows through the conduit 34 to first unlatch the hydraulic latch mechanism 36 and to then cause extension of cylinder 28 that raises the cab. After maintenance or repair of the associated vehicle engine is completed with the cab in its access position, the control valve 88, FIGS. 3 and 4, is opened by rotating valve element 116 to permit the fluid flow back into the reservoir through control orifice 90. This allows the fluid within the cylinder 28 shown in FIG. 1 to flow through conduit 34 back into the reservoir as the cab concomitantly moves downwardly to the use position where it is subsequently latched by latch mechanism 36. The size of orifice 90 limits the rate of fluid flow to prevent excessively fast cab movement under the bias of gravity.

With reference to FIG. 2, pump 64 includes a housing having an upper portion 134 and a lower portion 136 that are slidable in a vertical direction with respect to each other in a telescoping fashion. Upper housing portion 134 is inserted downwardly through the threaded pump opening 62 during assembly and has an upper threaded end 138 that is threaded into the pump opening. A pair of annular seals 140 seal between the upper housing portion 134 and the cover plate 44 generally adjacent the upper and lower cover plate surfaces 54 and 56. A central bore 142 of the pump upper housing portion 134 opens downwardly to receive the upper end of the lower housing portion 136 in a slidable manner that is sealed by an annular seal 144. A central bore 146 of the lower housing portion 136 has a lower end that is communicated through a filter 148 and lower apertures 150 with the hydraulic fluid received within reservoir 42. During operation of the pump, the hydraulic fluid flows upwardly through bore 146 past a check valve 152. This check valve includes a ball 154 that is received within an enlarged diameter portion 156 in the upper end of lower housing portion 136. Ball 154 is seated by the bias of gravity aganist the upper end of bore 146 to prevent reverse fluid flow from the upper housing bore 142 back through the lower housing bore into the reservoir. A pin 158 extending across the upper end of lower housing portion 136 maintains the ball 154 in a captured relationship against upward movement out of the lower housing portion.

Figure 5:
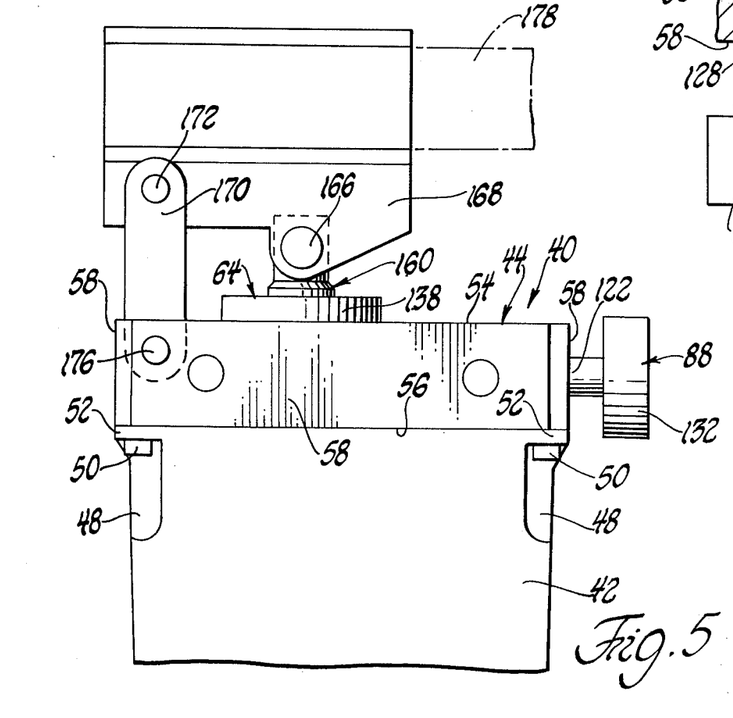
FIG. 5 is a partial elevation view taken along line 5—5 of FIG. 2.

As seen by combined reference to FIGS. 2 and 5, pump 64 includes a plunger 160 that projects upwardly through an opening 162 in the upper end 138 of the upper pump housing portion. This opening 161 includes seals 164 that seal with the plunger 160 during vertical plunger movement. A pin 166 pivotally connects the upper end of plunger 160 to a pump handle fitting 168 that is also pivotally connected to one end of a link 170 by a pin 172. The other end of link 170 extends downwardly into a short groove 174, FIG. 3, in the cover plate and is pivotally connected to the cover plate by a pin 176. A suitable handle 178 shown by phantom lines in FIG. 5 is attachable to the handle fitting 168 and is manually moved up and down to cause vertical reciprocation of the pump plunger 160.

With reference to FIG. 2, pump plunger 160 has a lower end 180 with a threaded hole 182 opening downwardly to receive the upper threaded end of an attachment member 184. The attachment member 184 extends through an aperture 186 in a lower piston portion 188 of the plunger. A lower head 190 of the attachment member 184 engages the lower sides of the piston portion 188 and seats the piston portion against the lower end 180 of the pump plunger. Piston portion 188 carries a seal 192 slidably engaged with the upper housing bore 142 in a fluid type manner so as to be divided into a lower chamber 194 and an upper chamber 196. A central vertical bore 198 in the attachment member 184 has a lower end that is communicated with the lower bore chamber 194 just above the check valve 152 of the lower pump housing portion 136. A check valve 200 is located at the upper end of attachment member bore 198 to permit fluid flow upwardly into the upper bore chamber 196 through side holes 202 in the plunger but to prevent fluid flow in the opposite direction. Check valve 200 includes a ball 204 engaged from above by an inverted T-shaped valve element 206 that is spring biased downwardly by a spring 208. Resilient deflection of spring 208 upwardly allows ball 204 to be unseated from the upper end of attachment member bore 198 to permit upward fluid flow into the upper bore chamber 196. However, reverse fluid flow downwardly through bore 198 is prevented by the seating of ball 204 under the bias of spring 208. A passage 210 of the upper pump housing portion 134 communicates the upper bore chamber 196 with the pump opening 62 of cover plate 44 and thus with the main bore 66.

Operation of pump 64 will now be described with reference to FIG. 2. Upward pumping movement of plunger 160 moves the piston portion 188 upwardly within the bore 132 in the upper housing portion 134. This movement enlarges the size of the lower bore chamber 194 below piston portion 188 and draws hydraulic fluid through the lower housing portion apertures 150 upwardly through bore 146 and check valve 152 as ball 154 unseats from the upper end of bore 146. Downward pumping movement of plunger 160 then decreases the size of the lower bore chamber 194 and, consequently, causes fluid flow upwardly through the attachment member bore 198 through check valve 200 and outwardly through holes 202 to fill the upper bore chamber 196. Upon subsequent upward movement of plunger 160, upper bore chamber 196 decreases in size such that the fluid received therein is pumped outwardly through the passage 210 to the main bore chamber 66 while the lower bore chamber 194 is filled by fluid flowing upwardly from the reservoir through the check valve 152. Downward movement of plunger 160 then causes a decrease in the combined volumes of bore chambers 194 and 196 such that there is a consequent upward fluid flow through check valve 200 and outwardly through passage 210 into the main bore 66 of cover plate 44. Pump 64 is a double acting pump due to its pumping action during both upward and downward movement of plunger 160. However, it should be pointed out that a single acting pump which pumps during upward plunger movement or during downward plunger movement could also be utilized with the cover plate 44 and such a pump could have the telescoping construction provided by upper and lower housing portions 134 and 136 to permit the pump to be utilized with reservoirs of different heights while still being capable of pumping the fluid within the bottom of each reservoir.

Figure 6:
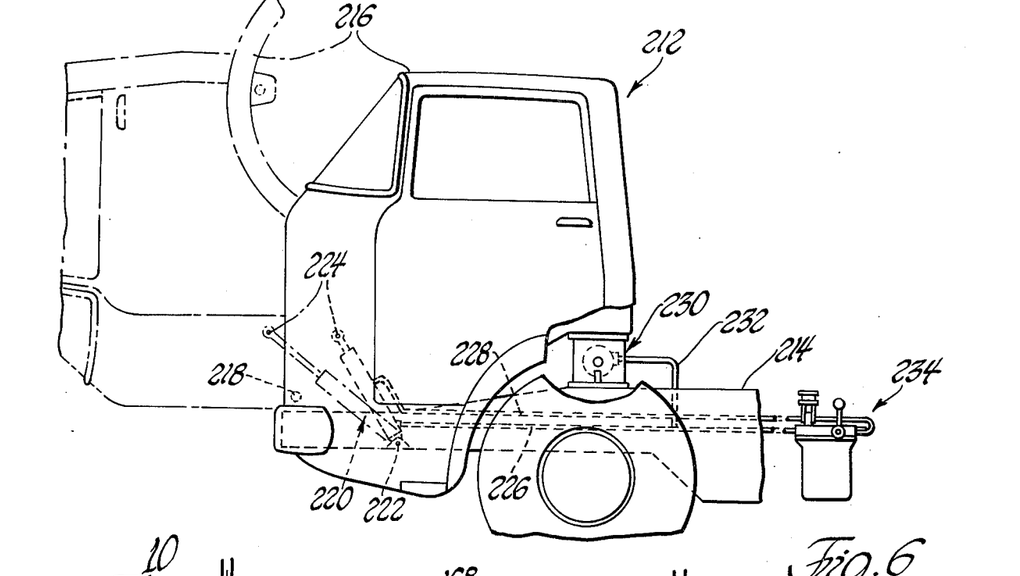
FIG. 6 is a side elevation view of a vehicle including tilting cab control apparatus embodying the present invention and designed to function with a double acting cylinder that is driven in both extending and retracting directions by pumped hydraulic fluid to move the passenger cab between the solid and phantom line positions shown.

Referring to FIG. 6, a vehicle collectively indicated by reference numeral 212 includes a frame 214 and a passenger cab 216 pivotally supported on the frame for movement about a transverse pintle 218 between the solid line indicated use position and the phantom line indicated access position where the vehicle engine, not shown, is accessible for maintenance and repair. A double acting hydraulic cylinder 220 has one end 222 connected to frame 214 and another end 224 connected to cab 216 such that cylinder retraction and extension drive the cab between the two positions shown. A hydraulic conduit 226 is fed hydraulic fluid to cause the cylinder extension that moves the cab to the access position shown by phantom lines, while another conduit 228 supplies hydraulic fluid to the cylinder to cause cylinder retraction that moves the cab to its use position shown by solid lines. A latch mechanism 230 secures the cab 216 to the frame 214 in the use position and is fed hydraulic fluid from a conduit 232 tapped off to conduit 226 in order to provide unlatching of the latch mechanism prior to commencement of cylinder extension causing the upward cab movement toward the access position. Another embodiment of control apparatus according to the present invention for use with the tilting cab vehicle 212 having the double acting cylinder 220 is indicated by reference numeral 234.

With reference to FIGS. 7-10, control apparatus 234 includes certain components that are the same as the components of control apparatus 40 previously described in connection with FIGS. 1-5. Consequently, like numerals are utilized to indicate these components for both embodiments of the control apparatus and the previous description of the components in connection with apparatus 40 is applicable to apparatus 234 as well without a complete repetition of the description of the structure involved.

Figure 7:
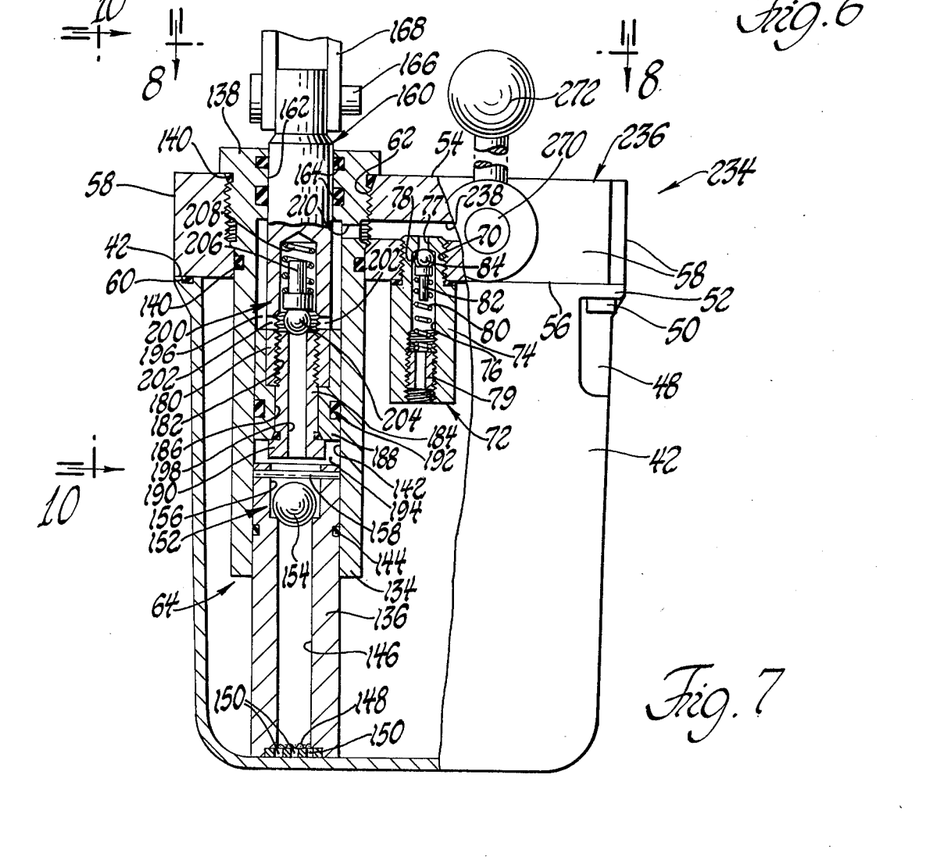
FIG. 7 is an enlarged view partially in section of the apparatus shown in FIG. 6.

As seen in FIG. 7, control apparatus 234 includes a cover plate 236 mounted over an upwardly oriented opening 46 of a fluid reservoir 42. Cover plate 236 is generally square when viewed in the plan direction, FIG. 8, and the reservoir 42 has corner grooves 48 for permitting attachment bolts 50 to be inserted upwardly through apertured reservoir flanges 52 for threading into the cover plate. Parallel upper and lower surfaces 54 and 56 of cover plate 236, FIG. 7, extend horizontally and are connected by edge surfaces 58 that define the periphery of plate 236. Adjacent its junction with the edge surfaces 58, the lower surface 56 includes a mounting portion that is sealed with a seal 60 extending about the reservoir opening 46. A pump opening 62 extends vertically between the upper and lower surfaces 54 and 56 and mounts a "double acting" pump 64 of a construction identical to the pump previously described. A main bore 238 of the cover plate extends horizontally between the upper and lower plate surfaces and has an inner end fed hydraulic fluid from pump 64 adjacent a relief opening 70 that mounts a pressure relief valve 72 having a construction identical to the relief valve previously described so as to be capable of permitting excessively pressurized fluid to flow from the main bore back to the reservoir 42.

Figure 8:
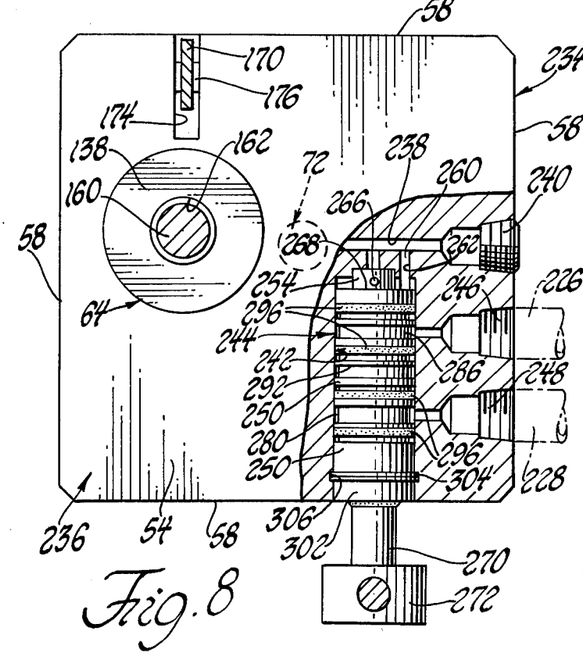
FIG. 8 is a top plan view of the apparatus taken approximately along line 8—8 of FIG. 7 but partially in section to show a control valve.

As seen in FIG. 8, the main bore 238 of cover plate 236 has an outer end that is closed by a plug 240 in one of the side plate edges 58. Intermediate its inner and outer ends, main bore 238 is communicated with a control valve bore 242 that receives a control valve 244. Output ports 246 and 248 communicate with control valve bore 242 and open outwardly through one of the exposed plate edge surfaces 58 for respective connection to the conduits 226 and 228 that feed hydraulic fluid to the cylinder 220 shown in FIG. 6.

Figure 9:
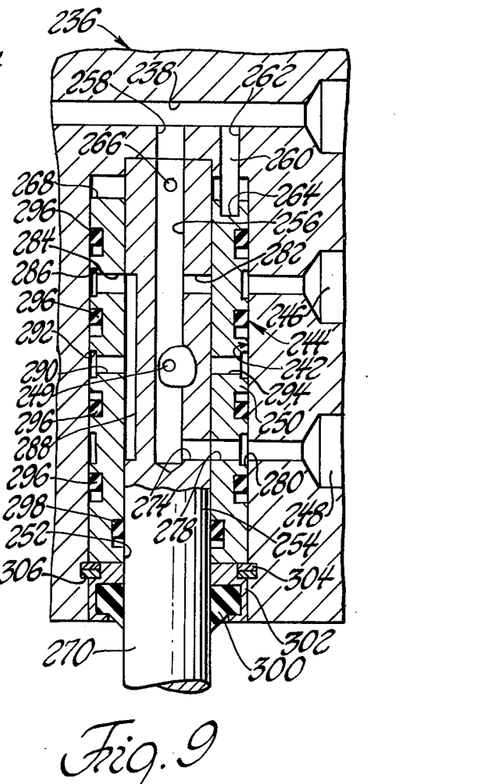
FIG. 9 is an enlarged view of a portion of FIG. 7 showing the control valve in section.

As seen by reference to FIG. 9, the lower side of control valve bore 242 communicates with a control orifice 249 that opens downwardly through the lower cover plate surface to feed hydraulic fluid to the fluid reservoir. Control valve 244 includes a valve housing 250 that is received within the bore 242. The valve housing 250 has an elongated shape with an angular configuration defining a central bore 252. An elongated valve element 254 of the control valve is received within bore 252 and includes a central bore 256 at its inner end. Bore 256 has an inner end that communicates with a reduced diameter bore portion 258 of bore 242. Hydraulic fluid from the main bore 238 of cover plate 236 is thus fed into the valve element bore portion 256 through bore portion 258. A pin 260 is received within a hole 262 in the cover plate and extends into a hole 264 in the valve housing 250 so as to prevent rotation of the valve housing. Another pin 266 extends transversely through the inner end of valve element 254 and engages the inner end 268 of the valve housing so as to maintain the valve element within the housing against axial outward movement. Pin 266 has opposite ends which engage the pin 260 so as to limit the valve element rotation to just slightly less than 180° between two positions that are subsequently described.

Figure 10:
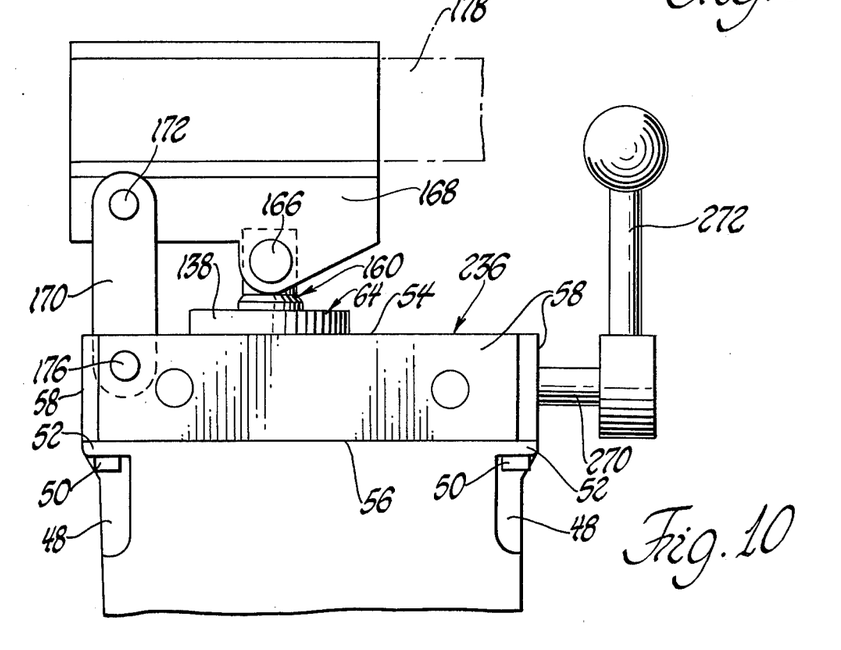
FIG. 10 is a partial elevation view of the apparatus taken along line 10—10 of FIG. 7.

As seen in FIG. 10, the valve element has an outer end 270 that suppots a manually rotatable handle 272 for rotating the valve element. With the valve element 254 positioned in its FIG. 9 position, a first radial passage 274 of the valve element opens outwardly to feed a radial portion 278 of an annular first passageway 280 in valve housing 250. Fluid fed through this passageway is conducted to the output port 248 so as to feed the conduit 228, FIG. 6, in a manner that causes retraction of cylinder 220. Referring back to FIG. 9, a second radial passage 282 of valve element 254 is oriented in the same direction as passage 274 and faces away from a radial portion 284 of a second annular passageway 286 in the valve housing. A third passage 288 of valve element 254 extends axially and has an inner end that communicates with passageway portion 284 in the position shown such that hydraulic fluid received from the port 246 during cyliner retraction is conducted through passageway 286 into passage 288. An intermediate portion of passage 288 communicates with a radial portion 290 of a third annular passageway 292 in the valve housing. The lower side of passageway 292 is communicated with the control orifice 249 that connects valve bore 242 to the lower surface of the cover plate so as to permit fluid to be fed back into the reservoir. Thus, with the valve element 254 positioned as shown in FIG. 9, fluid is fed through the port 248 to the cylinder 220, FIG. 6, through conduit 228 in order to cause cylinder retraction that moves the cab to the use position while the fluid received from the cylinder flows through conduit 226 back through the control valve 244 and through the cover plate control orifice 249 into the reservoir. The size of orifice 249 limits the rate of fluid flow to control the rate at which the cab is moved.

Rotation of the valve element 254 from its FIG. 9 position approximately 180° to a second position isolates the first radial passage 274 from port 248 while communicating the second radial passage 282 with the radial portion 284 of the second annular valve housing passageway 286. Fluid pumped to the main cover plate bore 238 is then fed to the port 246 that feeds the conduit 226 so as to cause unlatching of latch mechanism 230, FIG. 6, and extension of the hydraulic cylinder 220 for moving the cab to its access position. At the same time, the radial portion 278 of the first annular passageway 280 is communicated with the outer axial end of the third passage 288 in the valve element 254 so as to communicate with another radial portion 294 of the third annular valve housing passageway 292 so as to be communicated with the cover plate control orifice 249. Thus, during cylinder extension, hydraulic fluid received by port 248 from conduit 228 is fed through the control valve 244 back through the control orifice 249 into the pump reservoir at a controlled rate which limits the rate of cab movement.

As seen in FIGS. 8 and 9, the control valve housing 250 includes annular seals 296 that provide sealing of the annular passageways 280, 286, and 292. Within its bore 252, valve housing 250 also includes an annular seal 298 that seals with the valve element 254. Additionally, at the outer end of the control valve, a seal 300 seals with the valve element 254 and is received within an annular metal insert 302. A slight interference fit between the insert 302 and the outer end of control valve bore 242 maintains the seal insert in position. A helical clip 304 of two turns is received within an annular groove 306 at the outer end of the control valve bore so as to engage the outer end of the valve housing 250 in a manner that maintains the valve 244 within the control valve bore.

While preferred embodiments of the control apparatus have herein been described in detail, those skilled in the art will recognize various alternative designs and embodiments for practicing the present invention as defined by the following claims.

What is claimed is:

1. Tilting cab control apparatus comprising: a horizontally extended cover plate including upper and lower surfaces and edge surfaces extending between the upper and lower surfaces to define the periphery of the plate; the lower surface including a mounting portion for sealing engagement with a pump reservoir opening such that the upper and edge surfaces are exposed; a pump opening extending between the upper and lower surfaces; a relief valve opening in the plate communicating with the pump opening and opening downwardly through the lower surface of the plate to permit excessively pressurized fluid from the pump opening to flow back to the reservoir; a control valve bore located between the upper and lower surfaces of the plate extending inwardly from one of the edge surfaces thereof; said control valve bore being in communication with the pump opening to receive fluid therefrom; a control orifice communicating the control valve bore with the lower surface of the plate at a location spaced from said relief valve opening to permit controlled fluid flow from the control valve bore back to the reservoir; and an output port in the plate communicating with the pump opening and opening outwardly through one of the exposed plate surfaces to conduct fluid from the pump opening externally of the plate.

2. Apparatus as claimed in claim 1 and also including a control valve received within the control valve bore to selectively control the flow of fluid from the pump opening to the control valve bore and through the control orifice back into the reservoir.

3. Apparatus as claimed in claim 2 and also including a relief valve mounted within the relief valve opening to normally prevent fluid flow from the pump opening through the relief valve opening back into the reservoir when the pressure of the fluid from the pump opening is below a predetermined valve, said relief valve permitting fluid flow from the pump opening through the relief valve opening back into the reservoir when the pressure of the fluid from the pump opening is above the predetermined valve.

4. Apparatus as claimed in claim 3 and also including a pump mounted within the pump opening in a downwardly depending fashion so as to pump fluid from the reservoir to the control valve bore.

5. Apparatus as claimed in claim 4 wherein the pump and relief valve openings in the cover plate include threads and the pump and relief valve also include threads for mounting within their respective threaded openings in the plate.

6. Apparatus as claimed in claim 4 wherein the pump includes a housing having upper and lower portions slidable with respect to each other in a vertical direction, the upper housing portion of the pump being mounted within the pump opening of the plate, and the lower pump housing portion being movable vertically relative to the upper housing portion such that the pump can be used with reservoirs of different heights.

7. Apparatus as claimed in claim 6 wherein the upper housing portion includes a bore that slidably receives the lower housing portion, and the lower housing portion includes a check valve that permits fluid flow from the reservoir into the bore of the upper housing portion but prevents fluid flow therefrom back into the reservoir.

8. Apparatus as claimed in claim 1 wherein the plate includes a main bore having one end communicating with the pump opening and another end communicating with the output port, and the main bore includes an intermediate portion communicating with the control valve bore.

9. Apparatus as claimed in claim 8 wherein the control valve bore extends from the intermediate portion of the main bore in a perpendicular relationship.

10. Apparatus as claimed in claim 9 wherein the relief valve opening communicates directly with the main bore between the one end and the intermediate portion thereof.

11. Apparatus as claimed in claim 8 and also including a control valve received within the control valve bore and movable to either permit or prevent fluid flow from the main bore through the control valve bore and the control orifice back into the reservoir.

12. Apparatus as claimed in claim 1 wherein the cover plate includes two output ports, each of said output ports communicating with the pump opening through the control valve bore.

13. Apparatus as claimed in claim 12 and also including a control valve received within the control valve bore, said control valve including a valve element movable between first and second positions to selectively conduct fluid from the pump opening to one or the other of the output ports.

14. Apparatus as claimed in claim 13 wherein the control valve includes a valve housing that receives the valve element, said valve housing including first and second fluid passageways respectively communicating with the two output ports, said valve element including first and second passages for alternately feeding fluid from the pump opening to the first and second passageways of the valve housing in the first and second positions thereof, a third passageway in the valve housing communicating with the control orifice of the plate, and a third passage in the valve element that alternately communicates the two output ports with the third passageway in the two positions of the valve element so that the output port not being fed fluid from the pump opening is communicated to the control orifice to feed fluid back into the reservoir.

15. Apparatus as claimed in claim 14 wherein the plate includes a main bore communicating the pump opening with the control valve bore.

16. Apparatus as claimed in claim 15 wherein the main bore and the control valve bore extend perpendicular to each other.

17. Tilting cab control apparatus comprising: a horizontally extending cover plate including parallel upper and lower surfaces and edge surfaces extending between the upper and lower surfaces to define the periphery of the plate; a hydraulic fluid reservoir having an opening sealed with the lower surface of the plate such that the upper and edge surfaces thereof are exposed; a pump opening extending between the upper and lower surfaces of the plate; a pump mounted within the pump opening of the plate in a downwardly depending fashion so as to pump hydraulic fluid from the reservoir upwardly into the pump opening; a relief valve opening in the plate communicating with the pump opening and opening downwardly through the lower surface of the plate; a relief valve mounted within the relief valve opening to normally prevent fluid flow from the pump opening through the relief valve openig back to the reservoir except when the fluid within the pump opening is excessively pressurized; a control valve bore located between the upper and lower surfaces of the plate extending inwardly from one of the edge surfaces thereof in communication with the pump opening; a control orifice communicating the control valve bore and the lower surface of the plate; a control valve received within the control valve bore to selectively permit or prevent fluid flow from the pump opening through the control valve bore and the control orifice back into the reservoir; and an output port in the plate communicating with the pump opening and opening outwardly through one of the exposed plate surfaces to conduct fluid from the pump opening externally of the plate.

18. Tilting cab control apparatus comprising: a horizontally extending cover plate including upper and lower surfaces and edge surfaces extending between the upper and lower surfaces to define the periphery of the plate; a hydraulic fluid reservoir having an opening sealed with the lower surface of the plate such that the upper and edge surfaces thereof are exposed; a pump opening extending between the upper and lower surfaces of the plate; a pump mounted within the pump opening of the plate in a downwardly depending fashion so as to pump hydraulic fluid from the reservoir upwardly into the pump opening; a relief valve opening in the plate communicating with the pump opening and opening downwardly through the lower surfaces of the plate; a relief valve mounted within the relief valve opening to normally prevent fluid flow from the pump opening through the relief valve opening back to the reservoir except when the fluid within the pump opening is excessively pressurized; a control valve bore located between the upper and lower surfaces of the plate extending downwardly from one of the edge surfaces thereof in communication with the pump opening; a control orifice communicating the control valve bore and the lower surface of the plate; a pair of output ports communicating the control valve bore and at least one of the exposed plate surfaces; a control orifice communicating the control valve bore and the lower surface of the plate; a control valve received within the control valve bore and including a movable valve element having first and second passages for selectively and alternately communicating the pump opening with one of the output ports in a first position of the valve element and with the other output port in a second position of the valve element; and said valve element including a third passage for communicating the control orifice with the output port not communicated with the pump opening so as to permit flow into the plate and down into the reservoir.

* * * * *

UNITED STATES PATENT OFFICE
CERTIFICATE OF CORRECTION

Patent No. 4,026,113　　　　　　　　Dated May 31, 1977

Inventor(s)　　Clarence A. Sherman

It is certified that error appears in the above-identified patent and that said Letters Patent are hereby corrected as shown below:

Column 2, line 9 "tto" should be --to--.
Column 4, line 5 "36" should be --30--.
Column 5, line 2 "sealed" should be --seated--.
Column 7, line 1 "161" should be --162--.
Column 7, line 19 "sides" should be --side--.
Column 8, line 33 "to" first instance, should be --of--.
Column 9, line 43 "suppots" should be --supports--.
Column 9, line 59 "cyliner" should be --cylinder--.
Column 11, line 19 and Column 11, line 23 "predetermined valve" should be --predetermined value--.
Column 12, line 47 "openig" should be --opening--.
Column 13, line 15 "downwardly" should be --inwardly--.

Signed and Sealed this

Twenty-fifth Day of October 1977

[SEAL]

Attest:

RUTH C. MASON　　　　　　LUTRELLE F. PARKER
Attesting Officer　　Acting Commissioner of Patents and Trademark